(12) United States Patent
Sugiura et al.

(10) Patent No.: US 7,985,439 B2
(45) Date of Patent: Jul. 26, 2011

(54) VEGETABLE DRINK COMPOSITION

(75) Inventors: Yoko Sugiura, Sumida-ku (JP); Yuko Kubo, Sumida-ku (JP); Yoshikazu Ogura, Sumida-ku (JP)

(73) Assignee: Kao Corporation, Tokyo (JP)

( * ) Notice: Subject to any disclaimer, the term of this patent is extended or adjusted under 35 U.S.C. 154(b) by 782 days.

(21) Appl. No.: 11/908,304

(22) PCT Filed: Mar. 9, 2006

(86) PCT No.: PCT/JP2006/304612
§ 371 (c)(1),
(2), (4) Date: Sep. 11, 2007

(87) PCT Pub. No.: WO2006/098220
PCT Pub. Date: Sep. 21, 2006

(65) Prior Publication Data
US 2009/0011111 A1    Jan. 8, 2009

(30) Foreign Application Priority Data

Mar. 15, 2005 (JP) .................................. 2005-073460
Dec. 21, 2005 (JP) .................................. 2005-367445

(51) Int. Cl.
*A23L 2/02* (2006.01)
(52) U.S. Cl. .......... 426/599; 426/66; 426/521; 426/575; 426/615
(58) Field of Classification Search .................. 426/599, 426/66, 575, 521, 615
See application file for complete search history.

(56) References Cited

U.S. PATENT DOCUMENTS

| | | | |
|---|---|---|---|
| 5,851,578 A * | 12/1998 | Gandhi | ......... 426/590 |
| 6,168,821 B1 | 1/2001 | Castleberry | |
| 2003/0008058 A1 | 1/2003 | Ariga et al. | |
| 2003/0099753 A1 * | 5/2003 | Yang | ......... 426/599 |
| 2007/0154615 A1 | 7/2007 | Kubo et al. | |

FOREIGN PATENT DOCUMENTS

| | | |
|---|---|---|
| EP | 1 433 389 A1 | 6/2004 |
| EP | 1 698 240 A1 | 9/2006 |
| JP | 1 206976 | 8/1989 |
| JP | 8 9938 | 1/1996 |
| JP | 8 322524 | 12/1996 |
| JP | 10 14547 | 1/1998 |
| JP | 11 178516 | 7/1999 |
| JP | 2001 37455 | 2/2001 |
| JP | 2001 269148 | 10/2001 |
| JP | 2002-78469 | 3/2002 |
| JP | 2003-12537 | 1/2003 |
| JP | 2003-116496 | 4/2003 |
| JP | 2003-135038 | 5/2003 |

OTHER PUBLICATIONS

Benefiber (Tradename), 2002, pp. 1-4, http://www.benefiber.com/products/benefiberPowdersOrange.shtml.*
"Do Fruit Juice Drinks Actually contain any Real Juice", pp. 1-3, http://www.Healthsearchonline.com/real-fruit-in-juice-drinks/.5-6-10.*
U.S. Appl. No. 11/917,686, filed Dec. 14, 2007, Sugiura, et al.
U.S. Appl. No. 11/993,690, filed Dec. 21, 2007, Sugiura, et al.
U.S. Appl. No. 11/993,228, filed Dec. 20, 2007, Sugiura, et al.

* cited by examiner

*Primary Examiner* — Helen F Heggestad
(74) *Attorney, Agent, or Firm* — Oblon, Spivak, McClelland, Maier & Neustadt, L.L.P.

(57) ABSTRACT

A vegetable drink composition is provided. The vegetable drink composition is free of cooked odor attributable to heat sterilization treatment, is excellent in taste and also in the feeling as it passes down the throat when swallowed, and is possible to consume over a long period of time.

The vegetable drink composition has been subjected to heat sterilization treatment and has a vegetable solid content of from 0.001 to 0.09% by weight and a pH of from 3 to 5. It contains the following ingredients (A) and (B):

(A) from 0.1 to 15% by weight of one or more substances selected from the group consisting of water-soluble acidic polysaccharide dietary fiber, water-soluble neutral polysaccharide dietary fiber and indigestible oligosaccharide, and (B) 65% by weight or more of water.

16 Claims, No Drawings

VEGETABLE DRINK COMPOSITION

FIELD OF THE INVENTION

This invention relates to a vegetable drink composition, and also to a method for controlling cooked odor attributable to the heat sterilization treatment of a vegetable drink composition.

BACKGROUND OF THE INVENTION

Due to the ongoing changes of living conditions, there is a tendency for a lack of proper eating habits of today's Japanese people. Particularly serious problems lie in an increase in skipping meals, eating alone, over-consumption of energy caused by an excessive reliance on processed foods, and nutrient imbalance such as consumption shortages of dietary fiber and minerals. Such nutrient imbalance is one of the risk factors for life-style related diseases, and its adjustment is crucial to a healthy life. Sufficient consumption of vegetables and fruits proved to be useful for the correction of an imbalance in the intake of nutrients. In Japan, the targeted level of vegetable consumption is at least 350 g under the National Health Promotion for the $21^{st}$ Century ("Health Japan 21") (reference value: 292 g; the 1997 National Nutrition Survey). In the United States, meanwhile, it is recommended to take vegetables of 5 or more different types and fruits of three or more different types a day, with the aim of preventing life-style related diseases ("5+3 Campaign"). With such a background in view, it is deemed highly meaningful to make vegetables readily ingestible, in view of the nationwide promotion of a healthy life.

Processing vegetables into juice is an effective means, given its ability to make vegetables readily ingestible. A number of vegetable juices are on the market these days. Nevertheless, it is necessary for such vegetable juices to be subjected to a heat sterilization treatment so that the microbiological stability thereof could be maintained. However, the vegetable juices subjected to such a treatment tend to be shied away by consumers due to their cooked odor, despite their benefit of being recognized for a healthy life. Further, vegetable juices containing dietary fibers do not bring a good feeling for the throat when swallowed, so it is well known to finely chop vegetables into very small pieces and then to remove dietary fibers by microfiltration or the like, thereby improving the smooth feeling for the throat and making it easy to drink as possible (see, for example, Patent Document 1).

Patent Document 1: JP-A-2003-135038

DISCLOSURE OF THE INVENTION

The present invention, therefore, provides a vegetable drink composition subjected to heat sterilization treatment and having a vegetable solid content of from 0.001 to 0.09% by weight and a pH of from 3 to 5, containing the following ingredients (A) and (B):

(A) from 0.1 to 15% by weight of one or more substances selected from a group consisting of water-soluble acidic polysaccharide dietary fiber, water-soluble neutral polysaccharide dietary fiber and indigestible oligosaccharide, and (B) 65% by weight or more of water.

The present invention also provides a method for controlling cooked odor in a vegetable drink composition, which comprises adjusting the vegetable solid content to from 0.001 to 0.09% by weight.

DETAILED DESCRIPTION OF THE INVENTION

The present invention provides a vegetable drink composition, which is substantially free of cooked odor attributable to heat sterilization treatment, is excellent in taste and also in the feeling as it passes down the throat when swallowed, and is possible to consume over a long period of time.

The present inventors formulated drinks with vegetable juices added therein, and after heat sterilization treatment, conducted a variety of investigations about any possible cooked odor, the taste and the feeling as they passed down the throat when swallowed. As a result, it has been found that an adjustment of the solid content of vegetables to a particular range can reduce cooked odor after heat sterilization treatment and also that the addition of water-soluble acidic polysaccharide dietary fiber, water-soluble neutral polysaccharide dietary fiber and/or indigestible oligosaccharide can provide an excellent taste and a good feeling as it passes down the throat when swallowed and can also retain physiological action (intestinal-function controlling effects) expected by vegetable drinks.

The vegetable drink composition according to the present invention is substantially free of cooked odor attributable to heat sterilization treatment and further, is excellent in taste and also in the feeling as it passes down the throat when swallowed, and therefore, is possible to consume over a long period of time. In addition, the vegetable drink composition according to the present invention hardly affects intake calories. Despite the removal of water-insoluble dietary fiber derived from a vegetable or vegetables, the vegetable drink composition according to the present invention is also superb in intestinal-function controlling effects and bowel-movement improving effects owing to the addition of water-soluble dietary fiber or the like.

Examples of the vegetable drink composition according to the present invention include general vegetable drinks, with those containing vegetable juices in predetermined amounts, specifically, those containing vegetable juices as principal ingredients being preferred. Preferred are, for example, vegetable drinks such as those described in "Latest Soft Drinks", Compiled by the Editorial Committee for Latest Soft Drinks, pages 12-13, KORIN PUBLISHING CO., LTD. (published: Sep. 30, 2003). More specific examples include tomato juice, mixed tomato juice, carrot juice, mixed carrot juice, vegetable juice, and vegetable fruit juice.

As vegetables useful in the vegetable drink composition according to the present invention, tomatoes, carrots, spinach, cabbage, green peppers, broccoli, celery, kale, parsley, lemons and the like can be mentioned. The term "vegetable solid" means a solid material dispersed in an aqueous solution and having a size of 833 μm or smaller, and the solid content can be measured by a method to be described hereinafter.

Described specifically, a sample controlled at 25° C. is thoroughly stirred into a homogeneous state, and is then allowed to pass through a Tyler standard sieve (20 mesh). The under-sieve fraction is weighed as much as 50 g in a beaker (precisely-weighed value: M0), to which sodium chloride (12 g) is then added. Subsequent to stirring into a uniform mixture, the mixture is left over for 2 hours (sample solution). A heat-resistant, crucible-shaped, glass filter G-2 made of "PYLEX" (registered trademark), is thoroughly washed, and subsequent to heating at 525±5° C., approximately 3 g of diatomaceous earth ("CELITE No. 535") is placed. The diatomaceous earth is washed three times or more with water (20 mL, each), and further, three times or more with a 78% by weight aqueous solution of ethanol (20 mL, each). The glass filter with diatomaceous earth placed therein is dried in air, followed by heating at 130±5° C. for 1 hour. The glass filter with diatomaceous earth placed therein is allowed to cool down to room temperature in a desiccator, and is then precisely weighed with an accuracy up to the fourth decimal place (M1) ("Food Nutrient Labeling System", pages 46-51, Japan Health Food & Nutrition Food Association). With an approximately 19% aqueous solution of sodium chloride, the surface of the diatomaceous earth in the crucible-shaped glass filter is leveled to avoid variations in filtration rate, and under suction, the sample solution is poured into the filter. The beaker and glass filter are washed three times with an approximately 19% aqueous solution of sodium chloride (20 mL, each) and further, three times or more with a 60% by weight aqueous solution of ethanol (20 mL, each). They are heated at 105° C. for 2 hours, allowed to cool down to room temperature in a desiccator, and precisely weighed with an accuracy up to the fourth decimal place (M2). The solid content is indicated by a differential weight (M2−M1), and in terms of percentages, is expressed by 100×(M2−M1)/M0.

The solid content in the vegetable drink composition according to the present invention is from 0.001 to 0.09% by weight and may be preferably from 0.002 to 0.08% by weight, more preferably from 0.003 to 0.07% by weight, even more preferably from 0.004 to 0.06% by weight, all, in terms of dry weight. When solid matter is contained in a large amount in a vegetable juice, an adjustment of its solid content can be effected by removing the solid matter by filtration or centrifugal separation.

A water-soluble acidic polysaccharide dietary fiber useful as the ingredient (A) in the present invention is a member having water solubility among acidic polysaccharide dietary fibers. An acidic polysaccharide dietary fiber is a food fiber containing many acidic groups such as carboxyl groups, sulfonyl groups and/or sulfate residues. A white precipitate is observed when a 0.02 mol/L aqueous solution of sodium sulfate (1 mL) and a 1% by weight aqueous solution of cetyltrimethylammonium chloride (1 mL) are added to a 1% by weight aqueous solution of the water-soluble acidic polysaccharide dietary fiber useful in the present invention.

The water-soluble acidic polysaccharide dietary fiber useful as the ingredient (A) in the present invention is quantitated by an analytical method for dietary fiber (Prosky method) which is the standard AOAC method (Journal of Japanese Association for Dietary Fiber, 6 (1), 1-7, 2002). Described specifically, the amount of the water-soluble acidic polysaccharide dietary fiber is determined in terms of parts by weight by subtracting indigestible proteins and ash from the weight of a residue precipitated in an about 80% by weight ethanol subsequent to a series of enzymatic treatments under predetermined conditions.

The water-soluble acidic polysaccharide dietary fiber useful as the ingredient (A) in the present invention can be obtained through extraction, degradation and purification steps from a plant, a seaweed or bacterial cells. Illustrative are depolymerised alginic acid, alginic acid, carageenan, fucoidan, porphyrin, agaropectin, low-molecular-weight pectin, gum arabic, karaya gum, gellan gum, xanthan gum, and salts thereof. As the salts, alkali metal salts are preferred, with the sodium salts being more preferred. The water-soluble acidic polysaccharide dietary fiber is equipped with a property that reduces a grassy odor of a drink containing a vegetable juice having the grassy odor.

No particular limitation is imposed on the viscosity of an aqueous solution of the water-soluble acidic polysaccharide dietary fiber. It, however, becomes difficult to take the drink composition, for example, when the aqueous solution of the water-soluble acidic polysaccharide dietary fiber tends to gelate or has a high viscosity at a low concentration. For the formulation of a drink composition into a readily-ingestible form, it is hence preferred for the water-soluble acidic polysaccharide dietary fiber to have fluidity at room temperature in the form of a 1% by weight aqueous solution. Further, the viscosity of the 1% by weight aqueous solution may preferably be 200 mPa·s or lower, with 50 mPa·s or lower being more preferred. It is to be noted that the term "viscosity" as used herein means a value measured by a Brookfield viscometer while driving a rotor (Rotor No. 2) at a revolution speed of 60 revolutions per minute.

The water-soluble neutral polysaccharide dietary fiber useful as the ingredient (A) in the present invention can be obtained through extraction, degradation and purification steps from a plant, a seaweed or bacterial cells. Illustrative are indigestible dextrin, guar gum, hydrolyzed guar gum, pullulan, water-soluble corn fiber, hemicellulose, low molecular-weight hemicellulose, soybean dietary fiber, locust bean gum, konjak mannan, cardran, polydextrose, and agar.

The water-soluble neutral polysaccharide dietary fiber useful as the ingredient (A) in the present invention is quantitated by the analytical method for dietary fiber (Prosky method) which is the standard AOAC method (Journal of Japanese Association for Dietary Fiber, 6 (1), 1-7, 2002). Described specifically, the amount of the water-soluble neutral polysaccharide dietary fiber is determined in terms of parts by weight by subtracting indigestible proteins and ash from the weight of a residue precipitated in an about 80% by weight ethanol subsequent to a series of enzymatic treatment under predetermined conditions.

No particular limitation is imposed on the viscosity of an aqueous solution of the water-soluble neutral polysaccharide dietary fiber. It, however, becomes difficult to take the drink composition, for example, when the aqueous solution of the water-soluble neutral polysaccharide dietary fiber tends to gelate or has a high viscosity at a low concentration. For the formulation of a composition into a readily-ingestible form, it is hence preferred for the water-soluble neutral polysaccharide dietary fiber to have fluidity at 25° C. in the form of a 1% by weight aqueous solution. Further, the viscosity of the 1% by weight aqueous solution may preferably be 200 mPa·s or lower, with 50 mPa·s or lower being more preferred. It is to be noted that the term "viscosity" as used herein means a value measured by a Brookfield viscometer while driving a rotor (Rotor No. 2) at a revolution speed of 60 revolutions per minute.

The indigestible oligosaccharide as the ingredient (A) in the present invention is a glucide, which has a molecular weight of trisaccharide or higher and does not precipitate in an about 80% by weight ethanol after the series of enzymatic treatment by the analytical method for dietary fiber (Prosky method) which is the standard AOAC method. Such indigestible oligosaccharides include raffinose oligosaccharides, galactose oligosaccharides, oligosaccharides derived from resistant starch, fructooligosaccharides, xylooligosaccharides, lactosucroses, soybean oligosaccharides, isomaltooligosaccharides, mannan oligosacchrides, and the like. A indigestible oligosaccharide is promptly fermented in the intestine, and assists the growth of beneficial enterobacteria and regulates the intestinal environment. An oligosaccharide has a function that especially in an upper part of the large intestine, it promotes colonic motor and induces bowel movement via short-chain fatty acids as its fermentation products by enterobacteria.

As the ingredient (A), a water-soluble acidic polysaccharide dietary fiber or a water-soluble neutral polysaccharide dietary fiber is preferred. Among them, sodium degraded alginate, indigestible dextrin, guar gum hydrolyzate or polydextrose is preferred.

The content of the ingredient (A) in the vegetable drink composition according to the present invention may be preferably from 0.1 to 15% by weight, more preferably from 0.5 to 12% by weight, even more preferably from 1.0 to 10% by weight, even more preferably from 2 to 8% by weight, yet even more preferably from 3 to 6% by weight.

The vegetable drink composition according to the present invention is required to contain water as the ingredient (B) from the standpoint of drinkability. Although its content is 65% by weight or higher, it may be preferably 75% by weight or higher, more preferably 80% by weight, even more preferably from 81 to 99% by weight, even more preferably from 84 to 96% by weight. A fruit juice may also be mixed in addition to a vegetable juice. It is to be noted that the content of water in the vegetable drink composition includes not only the water derived from a vegetable juice added to the vegetable drink composition but also water which may be added as desired—such as mineral water, natural water, deionized water, refined water or city water—and water derived from an optional ingredient such as a juice.

From the standpoints of still better drinkability and taste, the vegetable drink composition according to the present invention may have a sugar content of preferably from 5 to 15%, more preferably from 5 to 12%, even more preferably from 6 to 11.5%, even more preferably from 6 to 10%. An adjustment in sugar content can also be effected by adding water or a glucide such as sucrose.

From the standpoints of the storage stability and drinkability of the vegetable drink composition according to the present invention, the pH of the vegetable drink composition is from 3 to 5. Preferably, however, it may be from 3.5 to 4.8, with 4 to 4.5 being more preferred. A pH higher than 5 is not preferred because an offensive odor is produced, while a pH lower than 3 is unable to provide any vegetable drink composition which is satisfactory in taste.

From the standpoint of drinkability, the vegetable drink composition according to the present invention may preferably pass through a 20-mesh Tyler standard sieve (sieve opening: 833 μm), in other words, the solid matter contained in the vegetable drink composition may preferably have a size not greater than 833 μm.

In addition to the above-described ingredients, fruit juices, sugars (for example, starch, dextrin, etc.), proteins (casein, soybean protein, egg white, etc.), minerals (calcium carbonate, iron lactate, etc.), vitamins (vitamins A, $B_1$, $B_2$, $B_{12}$, C, etc.), edible oils and the like can be mixed either singly or in combination to the vegetable drink composition according to the present invention.

In the vegetable drink composition according to the present invention, it is possible to mix, either singly or in combination in accordance with the vegetable (s) and the ingredients derived from the above-described materials and additives, additives such as antioxidants, flavorings, various esters, organic acids, organic acid salts, inorganic acids, inorganic acid salts, inorganic salts, colorants, emulsifiers, preservatives, seasoning agents, pH regulators, and quality stabilizers. As the inorganic acids and inorganic acid salts, phosphoric acid, disodium phosphate, sodium metaphosphate, sodium polyphosphate and the like can be mentioned.

As in general drinks, a package useful with the packaged drink of the present invention can be provided in a conventional form such as a molded package made of polyethylene terephthalate as a principal component (a so-called PET bottle), a metal can, a paper container combined with metal foils or plastic films, a bottle or the like. The term "packaged drink" as used herein means a beverage that can be taken without dilution.

The vegetable drink composition of the present invention can be produced, for example, by filling the composition in a package such as a metal can and, when heat sterilization is feasible, conducting heat sterilization under sterilization conditions as prescribed in the Food Sanitation Act. For those which cannot be subjected to retort sterilization like PET bottles or paper packages, a process is adopted such that the composition is sterilized beforehand at a high temperature for a short time under similar sterilization conditions as those described above, for example, by a plate-type heat exchanger or the like, is cooled to a particular temperature, and is then filled in a package. Under aseptic conditions, additional ingredients may be mixed to and filled in a container with the vegetable drink composition of the present invention filled therein.

EXAMPLES

Measuring Method of Solid Content

A sample controlled at 25° C. was thoroughly stirred into a homogeneous state, and was then allowed to pass through a Tyler standard sieve (20 mesh). The under-sieve fraction was weighed as much as 50 g in a beaker (precisely-weighed value: M0), to which sodium chloride (12 g) was then added. Subsequent to stirring into a uniform mixture, the mixture was left over for 2 hours (sample solution). A heat-resistant, crucible-shaped, glass filter G-2 made of "PYLEX" (registered trademark), was thoroughly washed, and subsequent to heating at 525±5° C., approximately 3 g of diatomaceous earth ("CELITE No. 535") was placed. The diatomaceous earth was washed four times with water (20 mL, each), and further, three times with a 78% by weight aqueous solution of ethanol (20 mL, each). The glass filter with diatomaceous earth placed therein was dried in air, followed by heating at 130±5° C. for 1 hour. The glass filter with diatomaceous earth placed therein was allowed to cool down to room temperature in a desiccator, and was then precisely weighed with an accuracy up to the fourth decimal place (M1). With an approximately 19% aqueous solution of sodium chloride, the surface of the diatomaceous earth in the crucible-shaped glass filter was leveled, and under suction, the sample solution was poured into the filter. The beaker and glass filter were washed three times with an approximately 19% aqueous solution of sodium chloride (20 mL, each) and further, six times with a 60% by weight aqueous solution of ethanol (20 mL, each). They were heated at 105° C. for 2 hours, allowed to cool down to room temperature in a desiccator, and precisely weighed with an accuracy up to the fourth decimal place (M2). The solid content was indicated by a differential weight (M2−M1), and in terms of percentages, was expressed by 100× (M2−M1)/M0.

Examples 1-4 and Comparative Examples 1-5

Vegetable drink compositions of the formulations shown in Table 1 were formulated by using a tomato juice, and subsequent to heat sterilization, were filled in PET bottles to produce packaged vegetable-containing drinks. An adjustment of the solid content in each composition was effected by removing solid matter from the tomato juice, which abundantly contained solid matter, by centrifugation or filtration. After the pH of each composition was adjusted with citric acid and trisodium citrate, the composition was subjected to UHT sterilization under sterilization conditions of 124° C. and 30 seconds. It is to be noted that the solid content (% by weight) is a value determined by measuring the solid content of the tomato juice and converting it to an equivalent value in the corresponding packaged vegetable-containing drink. It is also to be noted that each sugar content was indicated in terms of an equivalent sucrose content by using a digital refractometer ("ATAGO RX-500").

TABLE 1

|  |  | Examples | | | | Comparative Examples | | | | |
|---|---|---|---|---|---|---|---|---|---|---|
|  |  | 1 | 2 | 3 | 4 | 1 | 2 | 3 | 4 | 5 |
| Added ingredients | Tomato juice | 96 | 96 | 96 | 96 | 96 | 96 | 96 | 100 | 84 |
|  | Low-molecular-weight sodium alginate[1] | 4 | 4 |  | 2 | 4 | 4 | 4 |  | 16 |
|  | hydrolyzed guar gum[2] |  |  | 4 | 2 |  |  |  |  |  |
|  | Total (parts by weight) | 100 | 100 | 100 | 100 | 100 | 100 | 100 | 100 | 100 |
|  | Solid content (% by weight) | 0.08 | 0.006 | 0.006 | 0.006 | 1.3 | 0.006 | 0.006 | 0.006 | 0.08 |
|  | Water content (% by weight) | ≧80 | ≧80 | ≧80 | ≧80 | ≧80 | ≧80 | ≧80 | ≧80 | ≧80 |
|  | Sugar content (%) | 9.11 | 9.63 | 9.6 | 9.56 | 9.31 | 11.54 | 9.38 | 5.54 | 20.6 |
|  | pH | 4.24 | 4.31 | 4.14 | 4.32 | 4.41 | 2.88 | 5.13 | 4.18 | 4.64 |
| Assessment | Cooked odor | Low | Low | Low | Low | Reference | Low | Slightly low | Low | Low |
|  | Sticky feel | Low | Low | Low | Low | Reference | Low | Low | Low | High |
|  | Feeling as the drink passed down the throat | Good | Good | Good | Good | Reference | Equal | Equal | Good | Bad |
|  | Taste (depth) | Equal | Equal | Equal | Equal | Reference | Equal | Equal | Little | Equal |
|  | Offensive taste/offensive flavor | None | None | None | None | None | Felt | Felt | None | None |
|  | Overall evaluation | Superior | Superior | Superior | Superior | Reference | Inferior | Inferior | Equal | Inferior |

Note:
[1] Low-molecular-weight sodium alginate ("SOLGIN"; product of Kaigen Co., Ltd.)
[2] hydrolyzed guar gum ("SUNFIBER R"; product of Taiyo Kagaku Co., Ltd.)

A panel of three trained assessors ingested the vegetable drink compositions in random order, and assessed them for cooked odor, sticky feel, the feel as each composition passing down the throat when swallowed (stickiness), and taste (depth) while using the composition of Comparative Example 1 as a reference vegetable drink composition. The results are presented in Table 1.

As evident from Table 1, the vegetable drink compositions according to the present invention were controlled with respect to cooked odor, and were excellent in taste and feel as they passed down the throat when swallowed. On the other hand, the high solid content (Comparative Example 1) led to the production of cooked odor derived from the materials, the pHs higher than the range of from 3 to 5 (Comparative Examples 2 and 3) produced an offensive taste/offensive odor, and the simple reduction in the content of solid matter derived from the vegetable juice (Comparative Example 4) was inferior in taste. Further, the abundant inclusion of dietary fiber (Comparative Example 5) resulted in a high sticky feel and a bad feel as it passed down the throat when swallowed, and therefore, led to inferiority.

Examples 5 & 6

Using a green juice, vegetable-containing drinks were formulated as in Examples 1-4.

TABLE 2

|  |  | Examples | |
|---|---|---|---|
|  |  | 5 | 6 |
| Added ingredients | Green juice[3] | 96 | 96 |
|  | Indigestible dextrin[4] | 4 |  |
|  | Polydextrose[5] |  | 4 |
|  | Total (parts by weight) | 100 | 100 |
|  | Solid content (% by weight) | 0.002 | 0.002 |
|  | Water content (% by weight) | ≧80 | ≧80 |
|  | Sugar content (%) | 11.23 | 11.28 |
|  | pH | 3.96 | 3.95 |

Note:
[3] Green juice (kale, cabbage, parsley)
[4] Indigestible dextrin ("FIBERSOL 2H"; product of Matsutani Chemical Industry Co., Ltd.
[5] Polydextrose ("LITESSE ULTRA"; product of Danisco Japan Ltd.)

Example 7

A packaged vegetable-containing drink was produced in a similar manner as in Example 1 except for the use of a mixed juice of carrots, spinach, parsley and lemons (a material containing a carrot and spinach juice as much as 90% by weight based on the whole mixed juice in terms of an equivalent solid content before centrifugation) as a vegetable juice (solid content: 0.08% by weight, water content: 80% or higher, sugar content: 10.91%, pH: 4.23).

As a result, the packaged vegetable-containing drink was found to be low in cooked odor and sticky feel, good in the feel as it passes down the throat when swallowed, free of any offensive taste/flavor, and also earned a good assessment on the whole.

All the vegetable drink compositions of the present invention were controlled with respect to cooked odor, were free of any offensive taste/flavor, and were excellent in taste and the feel as they passed down through the throat.

The invention claimed is:

1. A process for producing the vegetable drink composition comprising:

(A) from 0.1 to 15% by weight of one or more substances selected from the group consisting of water-soluble acidic polysaccharide dietary fiber, water-soluble neutral polysaccharide dietary fiber, and indigestible oligosaccharide;

(B) 65% by weight or more of water; and
(C) one or more vegetable juices;
wherein the composition
has a vegetable solid content of from 0.001 to 0.09% by weight, wherein said vegetable solid is a solid material having a particle size of 833 μm or smaller;
has a pH of from 3 to 5, and
is subjected to a heat sterilization treatment subsequent to an adjustment of said vegetable content to from 0.001 to 0.09% by weight.

2. The process according to claim 1, wherein said water-soluble acidic polysaccharide dietary fiber is degraded alginic acid or a salt thereof.

3. The process according to claim 1, wherein said water-soluble neutral polysaccharide dietary fiber comprises one or more substances selected from the group consisting of indigestible dextrin, polydextrose, and a guar gum hydrolyzate.

4. The process according to claim 1, which has a sugar content of from 5 to 15%.

5. The process according to claim 1, which is a vegetable juice with said ingredient (A) added thereto.

6. A method for controlling cooked odor in a vegetable drink composition, which comprises adjusting a vegetable solid content to from 0.001 to 0.09% by weight, prior to heat sterilization treatment, in order to obtain said composition which is substantially free of cooked odor after heat sterilization treatment.

7. The process according to claim 6, which comprises adjusting a vegetable solid content to from 0.002 to 0.08% by weight, prior to heat sterilization treatment, in order to obtain said composition which is substantially free of cooked odor after heat sterilization treatment.

8. The process according to claim 6, which comprises adjusting a vegetable solid content to from 0.003 to 0.07% by weight, prior to heat sterilization treatment, in order to obtain said composition which is substantially free of cooked odor after heat sterilization treatment.

9. The process according to claim 6, which comprises adjusting a vegetable solid content to from 0.004 to 0.06% by weight, prior to heat sterilization treatment, in order to obtain said composition which is substantially free of cooked odor after heat sterilization treatment.

10. The process according to claim 1, wherein said water-soluble acidic polysaccharide dietary fiber is at least one selected from the group consisting of depolymerized alginic acid, alginic acid, carageenan, fucoidan, porphyrin, agaropectin, low-molecular-weight pectin, gum arabic, karaya gum, gellan gum, xanthan gum, and salts thereof.

11. The process according to claim 1, wherein said water-soluble neutral polysaccharide dietary fiber is at least one selected from the group consisting of indigestible dextrin, guar gum, hydrolyzed guar gum, pullulan, water-soluble corn fiber, hemicellulose, low molecular-weight hemicellulose, soybean dietary fiber, locust bean gum, konjak mannan, cardran, polydextrose, and agar.

12. The process according to claim 1, wherein said indigestible oligosaccharide is at least one selected from the group consisting of a raffinose oligosaccharide, a galactose oligosaccharide, an oligosaccharide derived from resistant starch, a fructooligosaccharide, a xylooligosaccharide, a lactosucrose, a soybean oligosaccharide, an isomaltooligosaccharide, and a mannan oligosaccharide.

13. The process according to claim 1, wherein said vegetable drink composition further comprises one or more fruit juices.

14. The process according to claim 1, wherein the vegetable drink composition has a vegetable solid content of from 0.002 to 0.08% by weight, and is subjected to a heat sterilization treatment subsequent to an adjustment of said vegetable content to from from 0.002 to 0.08% by weight.

15. The process according to claim 1, wherein the vegetable drink composition has a vegetable solid content of from 0.003 to 0.07% by weight, and is subjected to a heat sterilization treatment subsequent to an adjustment of said vegetable content to from from 0.003 to 0.07% by weight.

16. The process according to claim 1, wherein the vegetable drink composition has a vegetable solid content of from 0.004 to 0.06% by weight, and is subjected to a heat sterilization treatment subsequent to an adjustment of said vegetable content to from from 0.004 to 0.06% by weight.

* * * * *